Figure 1:
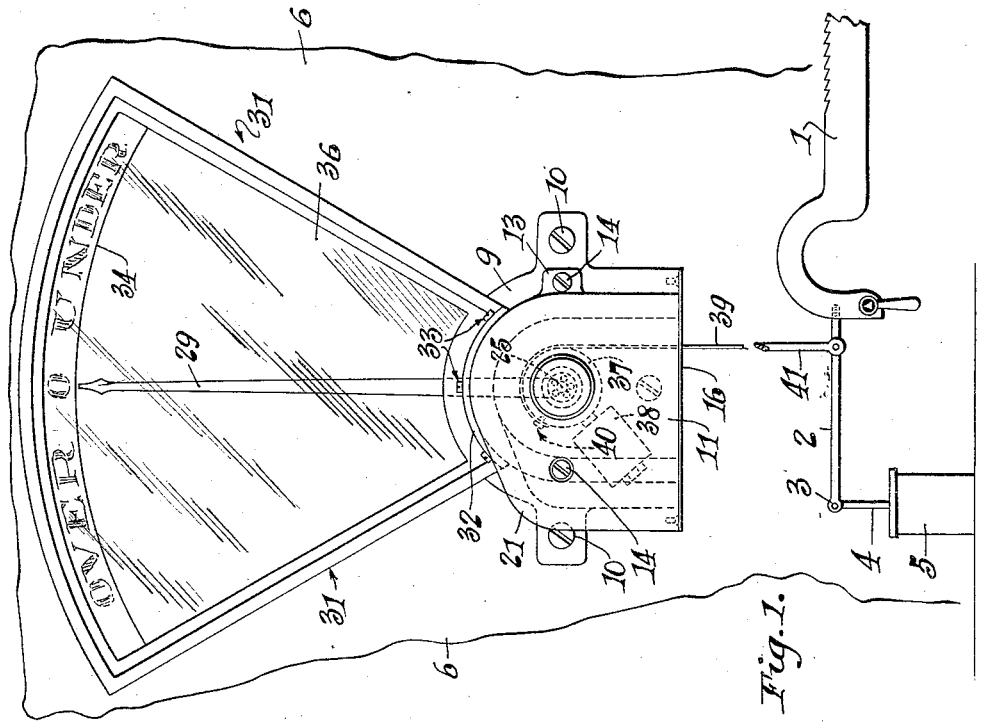

June 17, 1930.  M. H. STARR  1,764,537

BALANCE INDICATOR FOR PLATFORM SCALES

Filed Dec. 16, 1929   3 Sheets-Sheet 1

INVENTOR
M. H. Starr.
BY S. George Tate
ATTORNEY

June 17, 1930.  M. H. STARR  1,764,537
BALANCE INDICATOR FOR PLATFORM SCALES
Filed Dec. 16, 1929    3 Sheets-Sheet 2

INVENTOR
M. H. Starr.
BY J. George Tate
ATTORNEY

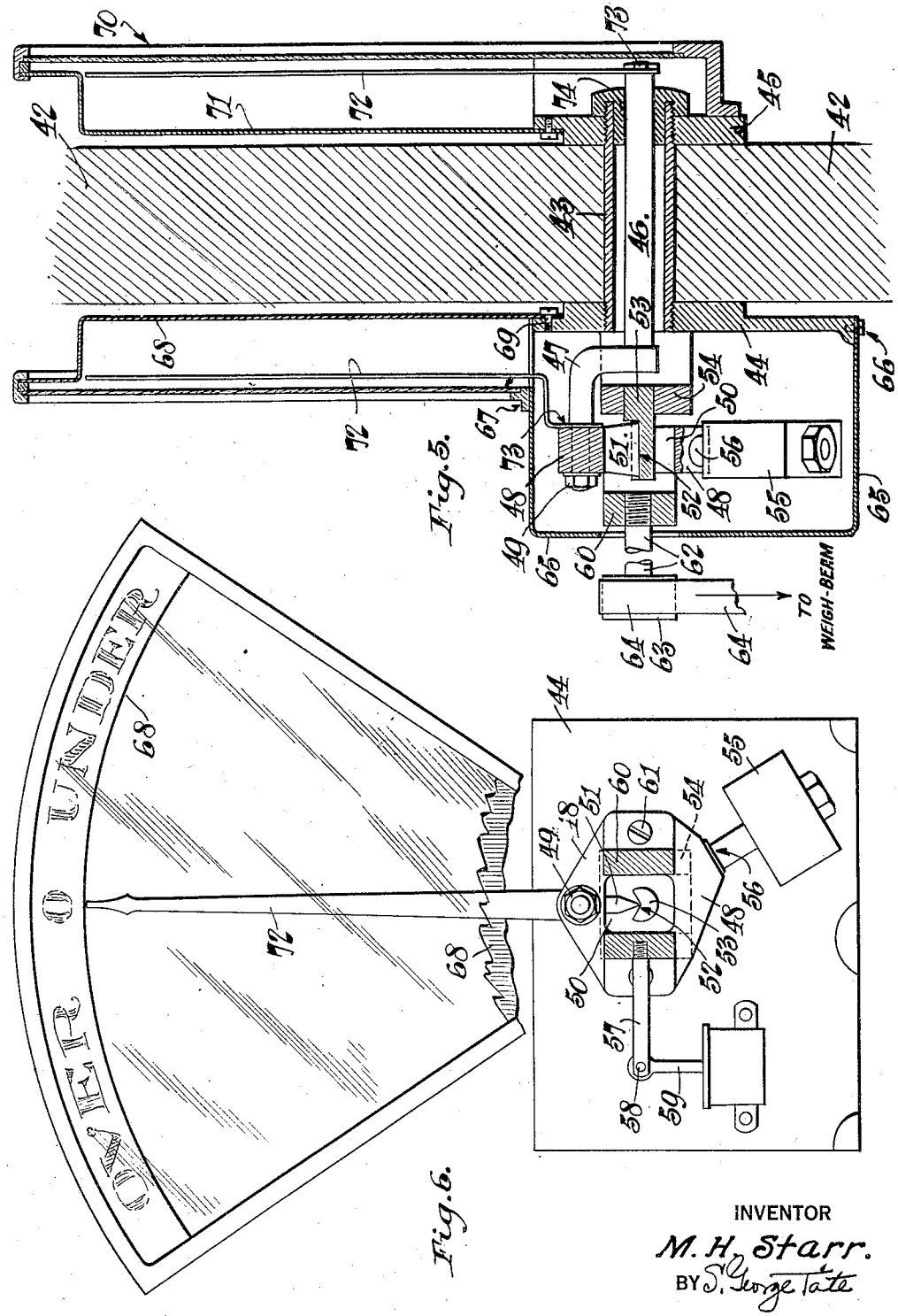

Patented June 17, 1930

1,764,537

UNITED STATES PATENT OFFICE

MORTON HULL STARR, OF HIGHLAND PARK, MICHIGAN

BALANCE INDICATOR FOR PLATFORM SCALES

Application filed December 16, 1929. Serial No. 414,503.

The invention generally relates to beam scales of the platform type and primarily has for its object to provide a novel indicator mechanism which is cooperatively connected with the scale beam to be moved thereby for the purpose of accurately indicating the balanced or unbalanced condition of said beam thereby to quickly indicate to an observer if the weight or load desired, and for which the poises have been set, has been placed upon the scale, or if said load is under or over said desired weight.

In the conventional use of platform scales the beam and poises are commonly positioned in a room or compartment which serves to house the checker or weigh-man and which is separated from the scale platform by a wall. Take for example the filling of an order for 3,000 pounds of coal. The usual practice is for the truck-man to load his truck in the yard as closely as he can estimate to 3,000 pounds and then drive onto the platform and ask the weigh-man to weigh the gross load. After this weighing, the weigh-man tells him how much over or under the 3,000 pounds his actual load is. The truck-man then adds to or subtracts from his load until he believes he has the correct amount, when the weighing operations are repeated. These proceedings continue until the 3,000 pound order is filled close enough for practical purposes. The need for constant service and cooperation of two men during the whole of these operations and the waste of time and labor and the inconveniences incident to these weighing practices will be obvious.

In its more detailed nature, therefore, the invention seeks to provide a novel indicator mechanism which when properly mounted in cooperative relation with the scale beam will enable the following simple weighing practices. The truck-man drives upon the scale platform with his approximation of 3,000 pounds. The weigh-man has set the beam poises for 3,000 pounds of coal and tare weight of truck, giving no further attention to the truck-man. When the latter has his truck entirely and alone on the scale, he observes the indicator which is viewable from the platform outside the housing wall and which shows automatically whether his load is greater or less than the required amount. He then adds to or subtracts from the load until the indicator shows the scale beam to be at perfect balance at which time he knows that he has accurately filled the order. The weighing operation thus completed, the truck-man then suitably signals that fact to the weigh-man and drives off the platform to release it for further use. He has not only materially speeded up the weighing operation but has actually filled the order for coal with exactness, and has made no demand upon the office weigh-man's time further than to set the poises correctly and finally to observe the indicator from within to check the truck-man's final reading of the indicator.

More specifically the invention resides in the provision of a novel "over" and "under" indicator including two indicator fingers, one of which is positioned and associated with an indicator plate outside the check room or housing and readable from the platform and the other of which is positioned and associated with an indicator plate within the housing. Both of said indicators are mounted to move with a single rock shaft which is suitably connected to the scale beam and is normally disposed to position the indicator fingers centrally at a zero reading whenever the scale beam is balanced but which shaft is rocked in one direction or the other when said beam is off balance to throw the indicator fingers to one side or the other of the zero reading to indicate the degree to which the load on the platform is "over" or "under" the weight for which the beam poises are set.

The invention further resides in the provision of novel means for rotatably mounting the ends of the rock shaft at opposite sides of the partition wall, and in so constructing said shaft that it may be operatively applied to receiving bores through partition walls of varied thicknesses.

The invention still further resides in the provision of a novel end bearing and housing for each shaft end, said housing being secured to the partition wall at the respective sides thereof and also serving as means for supporting individual housing for the indicator fingers and scale plates for cooperating with said fingers.

With these and other objects in view which will more fully appear, the nature of the invention will be more clearly understood by following the description, the appended claims, and the several views illustrated in the accompanying drawings.

Figure 2:
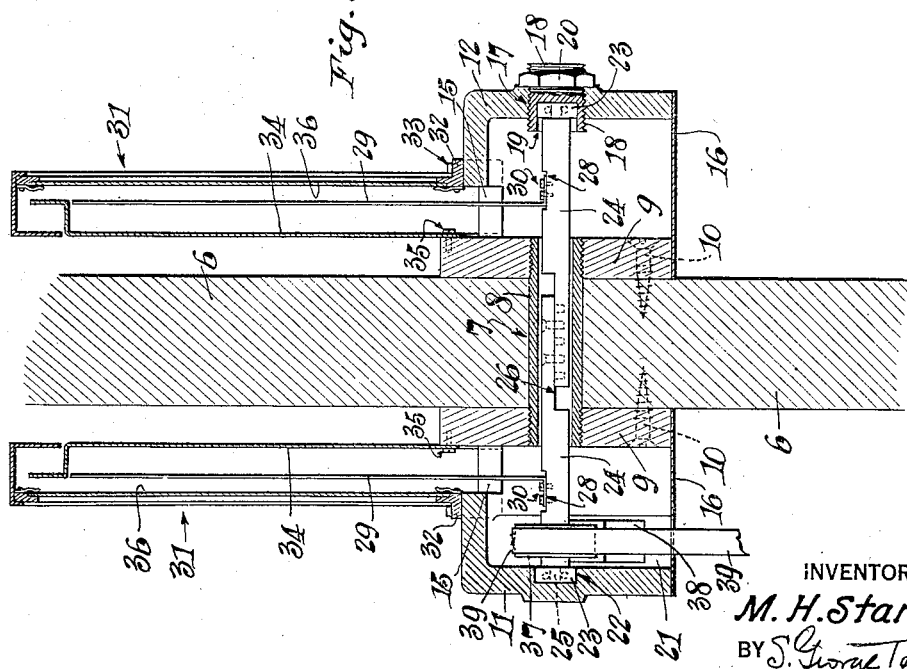
Figure 3:
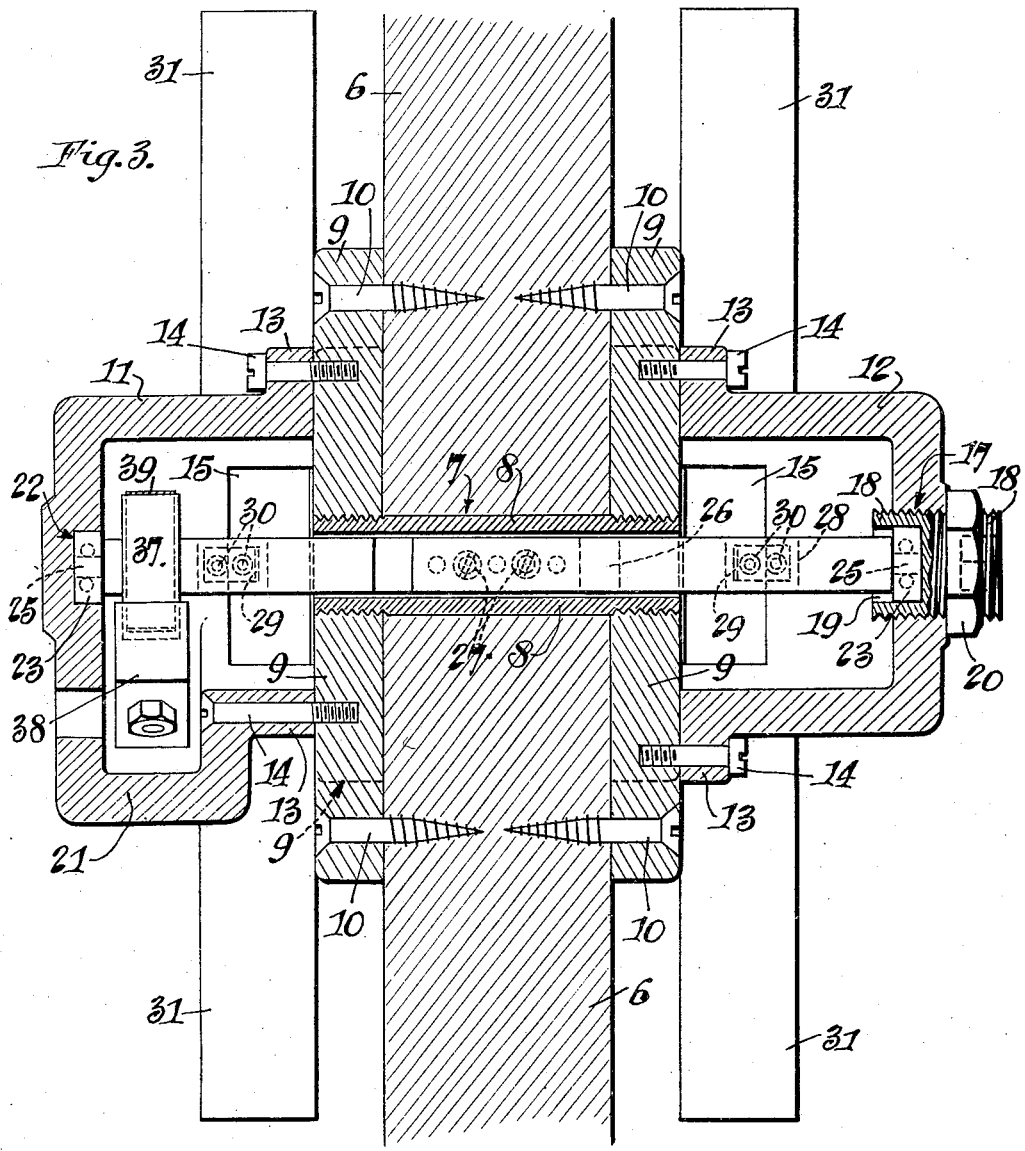
Figure 4:
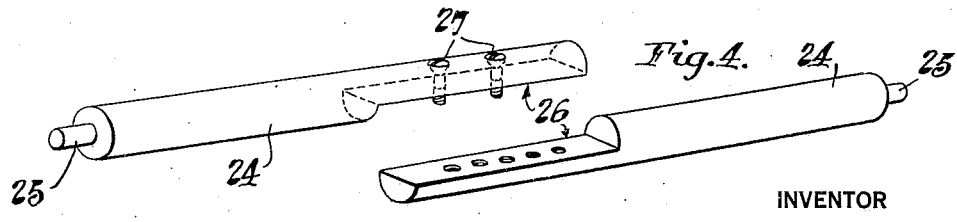

In the drawings:

Figure 1 is a somewhat diagrammatic face view illustrating the invention,

Figure 2 is a central vertical cross sectional view of the parts shown in Figure 1, Figure 3 is a horizontal section taken along the axis of the rock shaft, Figure 4 is a detail view illustrating the rock shaft per se, Figure 5 is a view similar to Figure 2 and illustrates a modification of the invention, and Figure 6 is an inside view of the parts shown in Figure 5, the inner housing cover being removed and the rock shaft end shown in cross section.

In the drawings in which like numerals of reference indicate like parts in all of the figures, 1 designates a scale or weigh-beam, it being understood that this beam comprises a part of any well known type of platform scale used for weighing loaded wagons and trucks. The well known adjustable poises employed with beams of this type are well understood both as to their structure and use and hence said poises are not shown in the drawings.

The scale beam 1 is provided with a rod extension 2 pivoted at 3 with a stem or plunger 4 operable in a movement steadying dashpot 5. This equipment serves to dampen the vibrations of the indicating means. In the usual construction of platform scales the weighing platform is located in a suitable position for having the wagons and trucks that are to be weighed, drive thereover. The scale or weigh-beam and poises are customarily positioned inside a suitable housing for accommodating the checker or weigh-man and which is divided by a wall from the weighing platform. This dividing wall is indicated at 6 in the drawings, and in the installation of my invention is bored as at 7 to receive a tube or sleeve 8. The sleeve 8 has its ends extended beyond each side of the wall where they are secured to housing plates 9, one of which opposes each side of the wall and is secured thereto by screws 10 as shown in Figures 1 and 3 of the drawings.

Housing cover bodies 11 and 12 are mounted upon the respective plates 9 and each housing is provided with suitable mounting ears 13 by which said bodies may be removably secured to said plates by screws or other securing means indicated at 14. Each of the bodies 11 and 12 is provided with an opening 15 through the top thereof, the purpose for which will be described later, and the housings are open at the bottom and are suitably closed by removable plates 16.

The cover body 11 is provided with a threaded bore 17 to receive an adjustable bearing plug 18 equipped with a bearing socket 19. The plug 18 may be secured in adjusted position by a suitable lock nut 20. The cover body 12 is provided with an offset 21 for accommodating the movement of a part which will be described later, and a bearing socket 22 which, when the cover bodies 11 and 12 are operatively mounted, will axially aline with the socket 19 in the plug 18. The sockets 19 and 22 are adapted to receive ball bearing units 23 and to thus provide end bearings for a rock shaft 24 which extends through the wall sleeve 8 and is provided with reduced ends 25 which are rotatably received in the ball bearing units 23.

It will be observed by reference to Figures 2 and 4 that the rock shaft 24 is formed in two halves lap-jointed as at 26 at the center and secured as at 27 in a manner for permitting longitudinal adjustment of the length of said shaft. In this manner the shaft may be adjusted to compensate for variations in wall thicknesses such as might otherwise seriously interfere with the installation of the apparatus. Each end of the shaft 24 which extends beyond the sleeve 8, is provided with a flattened surface 28 to which an indicator finger 29 is secured as at 30. It will be observed by reference to Figures 1 and 2 of the drawings that the indicator fingers 29 project through the cover body openings 15, said opening serving to accommodate the movement of said fingers occasioned by the rocking of the shaft 24 by which they are directly carried.

An indicator housing is provided for accommodating each indicator finger at the respective sides of the wall 6. Each such housing includes a body 31 equipped with an arcuate flange 32 adapted to be screw secured as at 33 upon the respective housing covers 11 and 12. Each housing 31 is open at the back to accommodate the positioning of a scale plate 34 which is directly secured as at 35 to the respective housing plate 9. In this manner the housing 31 may be removed when the housing cover by which it is carried is removed, without disturbing the scale plate. The housing may, of course, likewise be removed individually from the respective housing cover.

Each housing also includes a glass window 36 through which the indicator finger may be viewed and which serves to protect the interior of the indicator from the weather.

A drum 37 is secured on the end of the rock shaft 24 which projects into the housing cover 11 and a weight member 38 is secured to the drum and projects radially therefrom. A steel tape 39 is secured at one end as at 40 to the drum, passes part way around the drum and down through the bottom of said housing cover to be secured at 41 to the rod 2 carried by and projecting from the end of the beam 1. It will be observed by reference to Figures 1 and 2 of the drawings that as the weigh-beam moves down from a central or balanced position it will exert a pull upon the tape 39 such as will rotate the drum in a clockwise direction and move the indicator fingers 29 toward the right as viewed in Figure 1 to indicate an "under" or light weight condition of the load being weighed. As the weigh-beam moves upward from its balanced position the tape 39 will be permitted to slack and the weight 38 will then act to rotate the drum in the opposite direction and will cause the indicator finger to indicate an "over" or excess weight condition of the load being weighed. The housing cover body offset 21 serves to accommodate the movement of the weight 38. The dashpot equipment 5 will serve to steady the vibratory movement of the weigh-beam.

In the use of my improved apparatus, the only effort required on the part of the checker or weigh-man is the simple operation of setting the weigh-beam poises at the proper position for weighing the predetermined load and thereafter a glance to check the attainment of this load at the completion of the weighing operation. The driver after first loading his vehicle with what he believes to be the desired load, drives upon the platform of the scale, the poises having been previously set for the desired load. By observing the indicator housing on the outside of the wall the truck driver may quickly ascertain whether or not the load which he has taken up is accurate, under, or over the desired weight. If the load is not accurate, it is only necessary for him to add to or subtract therefrom until the indicator finger 29 comes to a central position as illustrated in Figure 1.

It will be obvious to those skilled in the art to which the invention relates that this apparatus eliminates the necessity of the weigh-man cooperating with the driver to any extent further than the mere setting of the poises in the first instance, and the final checking, by a glance at the inside indicator housing, the final attainment of the desired load at the completion of the weighing operation and just prior to the driving of the truck off the platform to free it for further use.

In the description preceding, I have disclosed the preferred form of my invention in which the indicator fingers are carried by a rock shaft rotatably mounted in ball bearings at its ends. In Figures 5 and 6 of the drawing, I have disclosed a slight modification of the invention in which the indicator fingers are carried by a shaft equipped with a knife edge pivot.

In this modified showing of the invention, the partition wall is indicated at 42 and the wall tube at 43. The tube is secured at its respective projecting ends to housing plates 44 and 45. A shaft 46 extends through the tube 43 and where it projects into the inner housing is provided with an upwardly extending crank portion 47.

A block 48 is secured at 49 to the inner end of the crank member and is provided with a central opening 50 into which projects a knife edge 51 for co-acting with a receiving socket 52 formed in the hub 53 which extends from a stirrup 54 forming a part of the housing plate 44. A weight member 55 projects from the block 48 in a direction radially from the axis of rotation of the shaft 46 and as its normal position is with its axis to one side of the vertical, it always tends to move the indicator fingers in one direction. An arm extension 57 is connected at 58 to a plunger 59 operable in a suitably supported dashpot and the said arm extension 57 is secured to project from a stirrup 60 which is in turn secured as at 61 to the block 48. The stirrup 60 also carries a stub shaft extension 62 which is axially alined with the shaft 46 and carries a drum 63 which has a steel tape 64 secured thereto and extending downwardly therefrom for association with the weigh-beam in the manner hereinbefore described in connection with the preferred embodiment of the invention.

A housing cover 64 is removably secured at 66 to the housing plate 44 and an indicator housing is removably secured as at 67 to said housing cover 65 as indicated in Figure 5 of the drawing. This housing is also open at the back and accommodates a scale plate 68 which is directly secured as at 69 to the plate 44.

A housing 70 is also provided for the outside indicator finger and is provided with a similarly secured and arranged back plate 71. The indicator fingers 72 are secured at 73 to the rock shaft 46, 47 and operate in the indicator housings in the same manner described in connection with the preferred embodiment of the invention. A bearing at the outside end of the shaft 46 may be provided at 74.

It is of course to be understood that the details of structure and arrangements of parts may be variously changed and modified without departing from the spirit and scope of my invention.

I claim:

1. In a platform scale wherein is provided a platform, a weigh-beam and a partition wall between the platform and the weigh-beam; an "over" and "under" indicator at each side of the partition wall, and means common to both indicators and actuated by the weigh-beam for indicating at both sides of the wall the balanced or unbalanced condition of said weigh-beam.

2. In a platform scale wherein is provided a platform, a weigh-beam and a partition wall between the platform and the weigh-beam; an "over" and "under" indicator at each side of the partition wall, and means including a longitudinally adjustable member extending through said wall and common to both indicators and actuated by the weigh-beam for indicating at both sides of the wall the balanced or unbalanced condition of said weigh-beam.

3. In a platform scale wherein is provided a platform, a weigh-beam and a partition wall between the platform and the weigh-beam; an "over" and "under" indicator at each side of the partition wall, and means including a rock shaft extending through said wall and common to both indicators and actuated by the weigh-beam for indicating at both sides of the wall the balanced or unbalanced condition of said weigh-beam, said indicators being directly mounted upon said shaft.

4. In a platform scale wherein is provided a platform, a weigh-beam and a partition wall between the platform and the weigh-beam; an "over" and "under" indicator at each side of the partition wall, a rock shaft extending through said wall and serving to carry said indicators, a housing for each shaft end secured to the respective faces of the wall, and means actuated by the weigh-beam for rocking the shaft and moving the indicators to indicate at both sides of the wall the balanced or unbalanced condition of said weigh-beam.

5. In a platform scale wherein is provided a platform, a weigh-beam and a partition wall between the platform and the weigh-beam; an "over" and "under" indicator at each side of the partition wall, a rock shaft extending through said wall and serving to carry said indicators, a housing for each shaft end secured to the respective faces of the wall, a rotary anti-friction bearing for an end of said shaft carried by each housing, and means actuated by the weigh-beam for rocking the shaft and moving the indicators to indicate at both sides of the wall the balanced or unbalanced condition of said weigh-beam.

6. In a platform scale wherein is provided a platform, a weigh-beam and a partition wall between the platform and the weigh-beam; an "over" and "under" indicator at each side of the partition wall, a rock shaft extending through said wall and serving to carry said indicators, a housing for each shaft end secured to the respective faces of the wall, a rotary anti-friction bearing for an end of said shaft carried by each housing, one of said bearings being bodily movable for take-up adjustments, and means actuated by the weigh-beam for rocking the shaft and moving the indicators to indicate at both sides of the wall the balanced or unbalanced condition of said weigh-beam.

7. In a platform scale wherein is provided a platform, a weigh-beam and a partition wall between the platform and the weigh-beam; an "over" and "under" indicator at each side of the partition wall, a rock shaft extending through said wall and serving to carry said indicators, a housing for each shaft end secured to the respective faces of the wall, a sleeve extending through said wall and surrounding said shaft, said sleeve being connected at its ends with the respective housings, and means actuated by the weigh-beam for rocking the shaft and moving the indicators to indicate at both sides of the wall the balanced or unbalanced condition of said weigh-beam.

8. In a platform scale wherein is provided a platform, a weigh-beam and a partition wall between the platform and the weigh-beam; an "over" and "under" indicator at each side of the partition wall, a rock-shaft extending through said wall and serving to carry said indicators, a housing plate surrounding each shaft end and secured to a respective face of the wall, a housing cover for each shaft end and removably secured to a respective housing plate, and means for rocking the shaft and moving the indicators to indicate at both sides of the wall the balanced or unbalanced condition of said weigh-beam.

9. In a platform scale wherein is provided a platform, a weigh-beam and a partition wall between the platform and the weigh-beam; an "over" and "under" indicator finger at each side of the partition wall, a rock shaft extending through said wall and serving to carry said indicator fingers, a housing for each shaft end secured to the respective faces of the wall, means actuated by the weigh-beam for rocking the shaft and moving the indicator fingers to indicate at both sides of the wall the balanced or unbalanced condition of said weigh-beam, said housings each having an opening therein to permit movement of the respective indicator finger, and a housing for each indicator finger directly mounted on the respective housings.

10. In a platform scale wherein is provided a platform, a weigh-beam and a partition wall between the platform and the weigh-beam; an "over" and "under" indicator finger at each side of the partition wall, a rock shaft extending through said wall and serving to carry said indicator fingers, a housing plate surrounding each shaft end and secured to a respective face of the wall, a housing cover for each shaft end and removably secured to a respective housing plate, means for rocking the shaft and moving the indicator fingers to indicate at both sides of the wall the balanced or unbalanced condition of said weigh-beam, each housing cover having an opening therein to permit movement of the respective indicator finger, a housing for each indicator finger directly mounted on the respective housings, each indicator housing being open at the back, and a scale plate forming a back closure for each indicator housing and directly secured to the respective housing plates.

11. In a platform scale wherein is provided a platform, a weigh-beam and a partition wall between the platform and the weigh-beam; an "over" and "under" indicator at each side of the partition wall, a shaft rotatably mounted at its ends and to which said indicators are directly attached for movement therewith, a drum mounted on said shaft, a tape secured at one end to and wound partially about said drum and having its other end connected to said weigh-beam and serving to rotate said shaft in one direction as the beam moves in one direction, and a weight secured to the drum and serving to rotate the shaft in the opposite direction as said beam moves in the other direction.

12. In a platform scale wherein is provided a platform, a weigh-beam and a partition wall between the platform and the weigh-beam; an "over" and "under" indicator at each side of the partition wall, a longitudinally adjustable shaft extending through said wall and rotatably mounted at its ends and to which said indicators are directly attached for movement therewith, a drum mounted on said shaft, a tape secured at one end to and wound partially about said drum and having its other end connected to said weigh-beam and serving to rotate said shaft in one direction as the beam moves in one direction, and a weight secured to the drum and serving to rotate the shaft in the opposite direction as said beam moves in the other direction.

13. In a platform scale wherein is provided a platform, a weigh-beam and a partition wall between the platform and the weigh-beam; an "over" and "under" indicator at each side of the partition wall, a rock shaft extending through said wall and serving to carry said indicators, a housing plate surrounding each shaft end and secured to a respective face of the wall, a housing cover for each shaft end and removably secured to a respective housing plate, a drum mounted on said shaft within one housing cover, a weight member carried by the drum and tending to rotate the shaft in one direction, and a tape secured at one end to the drum and wound partially around said drum and having its free end secured to the weigh-beam to cause the shaft to rotate in a direction opposite that in which it is rotated by said weight as the weigh-beam moves in a certain direction.

14. In a platform scale wherein is provided a platform, a weigh-beam and a partition wall between the platform and the weigh-beam; an "over" and "under" indicator finger at each side of the partition wall, a rock shaft extending through said wall and serving to carry said indicator fingers, a housing plate surrounding each shaft end and secured to a respective face of the wall, a housing cover for each shaft end and removably secured to a respective housing plate, a drum mounted on said shaft within one housing cover, a weight member movable with the drum and tending to rotate the shaft in one direction, and a tape secured at one end to the drum and wound partially around said drum and having its free end secured to the weigh-beam to cause the shaft to rotate in a direction opposite that in which it is rotated by said weight as the weigh-beam moves in a certain direction, said housings each having an opening therein to permit movement of the respective indicator finger, and a housing for each indicator finger directly mounted on the respective housings.

15. In a platform scale wherein is provided a platform, a weigh-beam and a partition wall between the platform and the weigh-beam; an "over" and "under" indicator finger at each side of the partition wall, a rock shaft extending through said wall and serving to carry said indicator fingers, a housing plate surrounding each shaft end and secured to a respective face of the wall, a housing cover for each shaft end and removably secured to a respective housing plate, a drum mounted on said shaft within one housing cover, a weight member movable with the drum and tending to rotate the shaft in one direction, and a tape secured at one end to the drum and wound partially around said drum and having its free end secured to the weigh-beam to cause the shaft to rotate in a direction opposite that in which it is rotated by said weight as the weigh-beam moves in a certain direction, each housing cover having an opening therein to permit movement of the respective indicator finger, a housing for each indicator finger directly mounted on the respective housings, each indicator housing being open at the back, and a scale plate forming a back closure for each indicator housing and directly secured to the respective housing plates.

16. In a platform scale wherein is provided a platform, a weigh-beam and a partition wall between the platform and the weigh-beam; an "over" and "under" indicator at each side of the partition wall, means common to both indicators and actuated by the weigh-beam for indicating at both sides of the wall the balanced or unbalanced condition of said weigh-beam, and damping means for limiting vibratory movement of the indicators.

17. In a platform scale wherein is provided a platform, a weigh-beam and a partition wall between the platform and the weigh-beam; an "over" and "under" indicator finger at each side of the partition wall, a rock shaft extending through said wall and serving to carry said indicator fingers, a housing plate surrounding each shaft end and secured to a respective face of the wall, a housing cover for each shaft end and removably secured to a respective housing plate, a drum mounted on said shaft within one housing cover, a weight member movable with the drum and tending to rotate the shaft in one direction, and a tape secured at one end to the drum and wound partially around said drum and having its free end secured to the weigh-beam to cause the shaft to rotate in a direction opposite that in which it is rotated by said weight as the weigh-beam moves in a certain direction, each housing cover having an opening therein to permit movement of the respective indicator finger, a housing for each indicator finger directly mounted on the respective housings, each indicator housing being open at the back, a scale plate forming a back closure for each indicator housing and directly secured to the respective housing plates, and damping means for limiting vibratory movement of the indicators.

In testimony whereof I affix my signature.

MORTON HULL STARR.